UNITED STATES PATENT OFFICE.

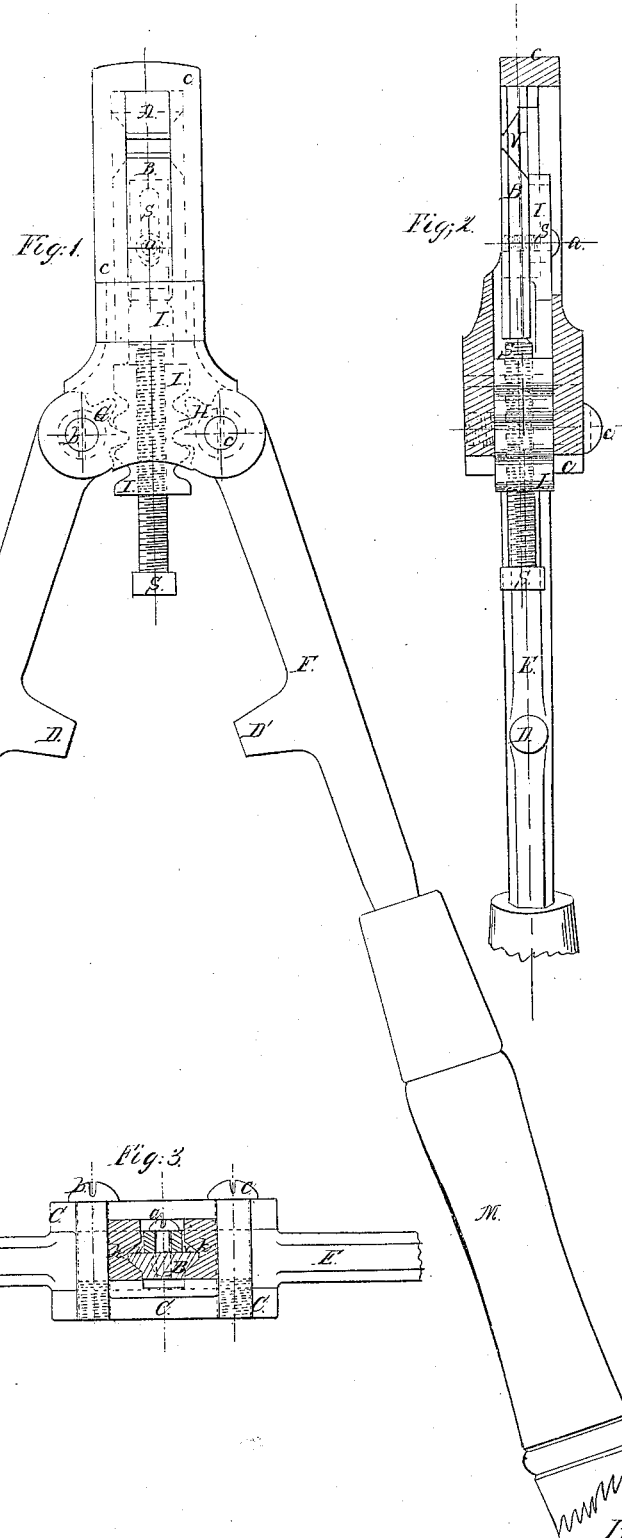

WILLIAM MENDHAM, OF PHILADELPHIA, PENNSYLVANIA.

IMPROVEMENT IN BOLT-CUTTERS.

Specification forming part of Letters Patent No. 102,026, dated April 19, 1870; antedated April 4, 1870.

*To all whom it may concern:*

Be it known that I, WILLIAM MENDHAM, of Philadelphia, in the State of Pennsylvania, have invented certain Improvements on the Bolt-Cutter patented by J. Johnson June 4, 1867; and I do hereby declare the following to be a full and correct description of the same, reference being had to the accompanying drawings, in which—

Figure 1 is a side elevation of the bolt-cutter with my improvements applied. Fig. 2 is a transverse section of the same through line $xx$ of Fig. 1, and Fig. 3 is a horizontal section.

The same part is marked by the same letter of reference in the several figures.

The nature of my improvements consists in making the movable cutter adjustable by attaching it to the upper end of the rack by means of a set-screw working in a slot and supporting it in position by an end screw passing up through the rack.

It further consists in supporting the movable cutter throughout its length by a V-groove cut in the frame, the cutter being provided with projections corresponding in form to the grooves in which they are received.

These improvements give precision to the movements of the cutter and enable a long cutter to be used in the first instance, the wear of which, by use or grinding, can be compensated by the adjusting-screw, which can bring the edges of the two cutters into correct juxtaposition, so that they shall just clear each other, when the levers are brought into contact to give the extreme movement to the movable cutter.

In the drawings which illustrate these improvements, A marks the stationary cutter, which is firmly fixed in the end of the frame C.

B is the movable knife, which is made long, as shown in Fig. 2, and slides in grooves V V in frame C, to which projections on its edges are adapted. The lower end of cutter B rests upon the upper end of an adjusting-screw, S, which passes up through the double rack I.

The rack I has teeth on both edges, as shown in Fig. 1, which engage with corresponding teeth on the segmental gears G H, which form the heads of the levers E F and turn on the screw-pins $b$ and $c$. The rack I has an arm, I', projecting upward nearly to the end of the cutter B, and to this arm that cutter is attached by means of a set-screw, $a$, passing through a slot, $s$, in the arm I'.

The levers E F are provided with stops D D', which limit their inward motion, and with handles L M, for their convenient operation. When these handles are drawn apart, the rack I, and with it the movable cutter B, are drawn down away from the fixed cutter A. When the handles are approximated as near together as the stops D D' will permit, the rack I is driven up to its highest position and the edge of the cutter B meets that of cutter A. Should either of these cutters wear away or be ground off, so as to fall short of meeting the other cutter when the stops D D' are in contact, the set-screw $a$ will readily make the needed adjustment, and the supporting-screw S will maintain the cutter B in its proper position.

Having thus fully described my invention, what I claim, and desire to secure by Letters Patent, is—

1. The combination of the levers E F, having the toothed segments G H, the rack-bar I, and the adjusting-screw S, in the manner and for the purpose described.

2. The movable cutter B, with V-guides, in combination with the slotted and recessed rack-bar and the levers E F, with toothed segments G H on their ends, in the manner and for the purpose specified.

The above specification of my said invention signed and witnessed at Philadelphia, this 27th day of July, A. D. 1869.

WILLIAM MENDHAM.

Witnesses:
    EDWIN CHAMBERS,
    W. PRICE DAVIS.